Feb. 26, 1963  N. A. BOLTON  3,079,077
MULTILANE TRAFFIC COUNTER
Filed Sept. 21, 1959  8 Sheets-Sheet 1

FIG. I.

INVENTOR.
N.A. BOLTON
BY
HIS ATTORNEY

DETECTION UNIT

SUBTRACT COUNT PULSE GENERATION

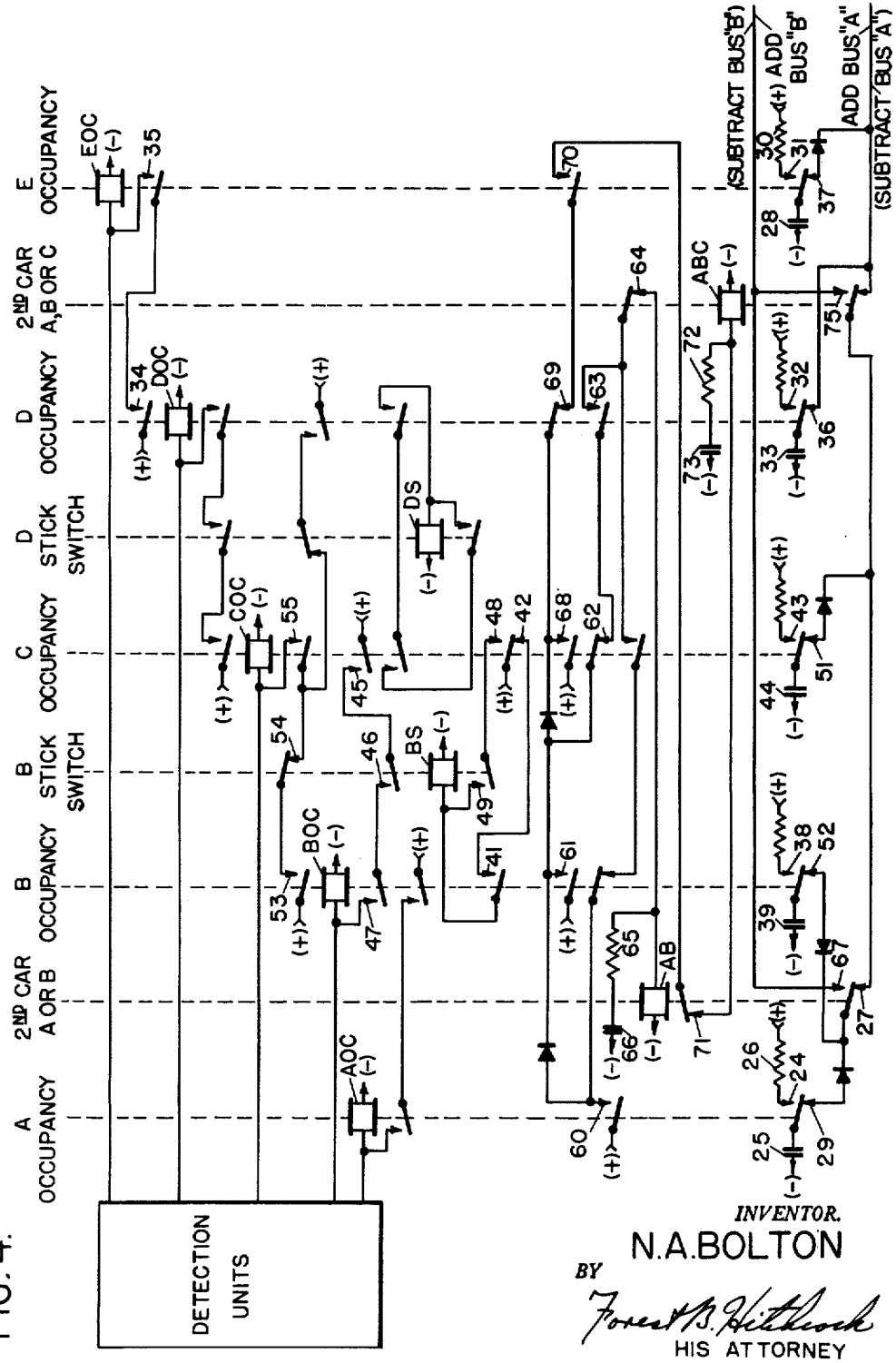

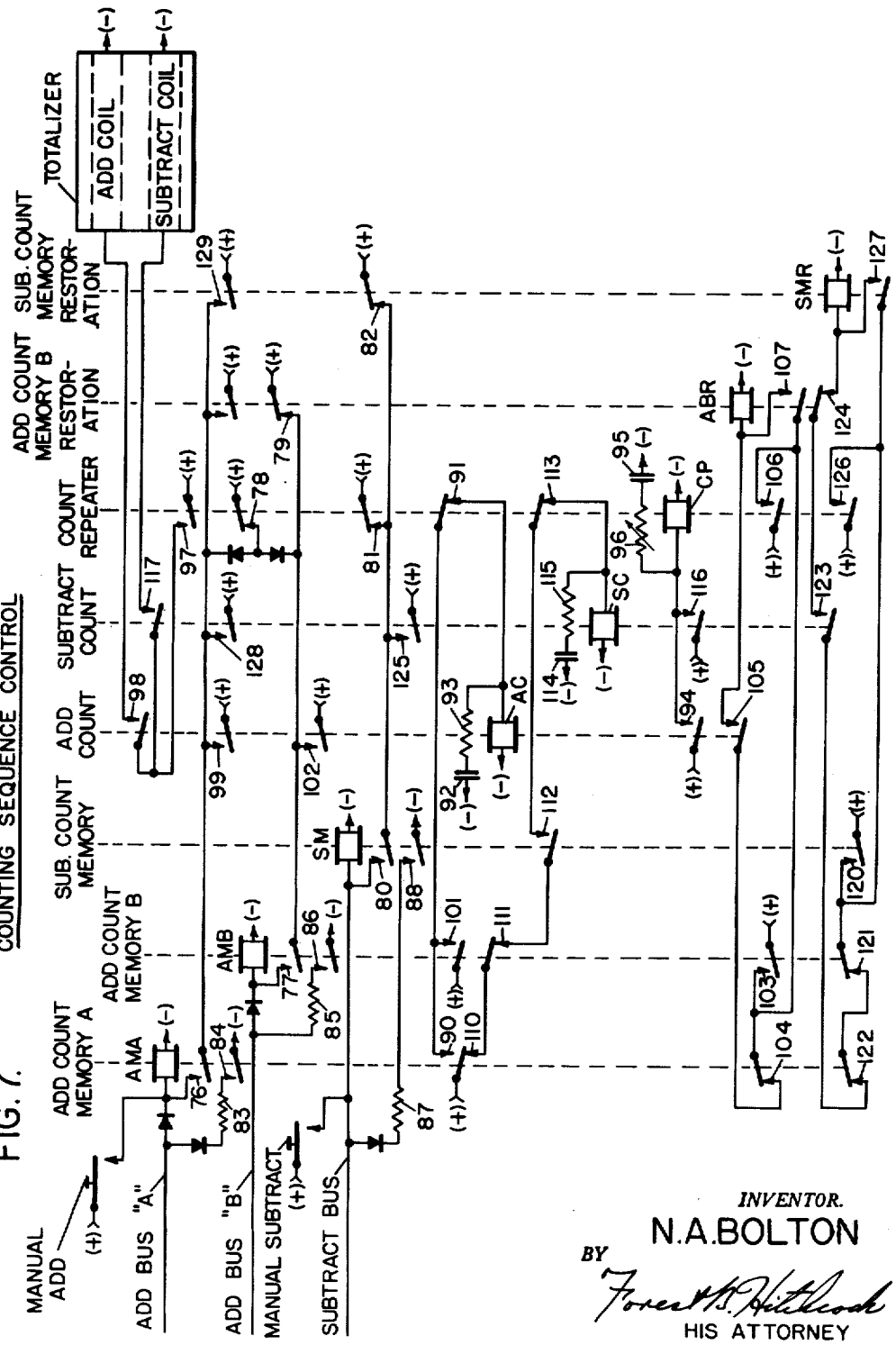

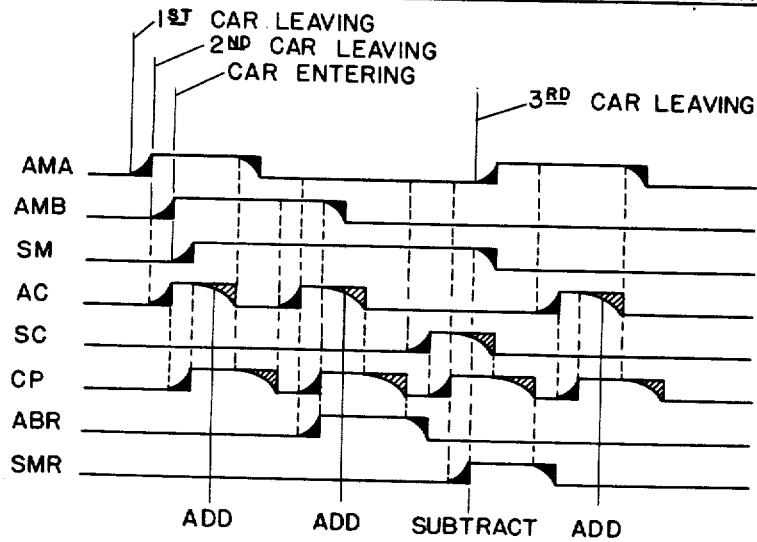

Feb. 26, 1963 N. A. BOLTON 3,079,077
MULTILANE TRAFFIC COUNTER
Filed Sept. 21, 1959 8 Sheets-Sheet 8

FIG. 10.

INVENTOR.
N.A. BOLTON
BY
HIS ATTORNEY

United States Patent Office 3,079,077
Patented Feb. 26, 1963

3,079,077
MULTILANE TRAFFIC COUNTER
Norman A. Bolton, Scottsville, N.Y., assignor to General
Railway Signal Company, Rochester, N.Y.
Filed Sept. 21, 1959, Ser. No. 841,389
13 Claims. (Cl. 235—99)

This invention relates to the separate detection and counting of a plurality of objects simultaneously passing a fixed monitoring point, and more particularly to the counting of vehicles entering and leaving a designated area by means of passageways wide enough to allow the passage of more than one vehicle at the same time.

The maintenance of accurate running totals of the spaces available in a given parking facility is vital to the efficient handling of large traffic loads in metropolitan areas. Presently utilized vehicle detection and counting methods using treadles, pneumatic tubes, light beams, etc., are each plagued by certain inaccuracies inherent in their very nature, such as the inability to differentiate people from vehicles and the detection of multiple-axles vehicles as more than one vehicle. In addition, these presently utilized detection methods necessitate the channeling of traffic into clearly defined lanes.

Some of the inaccuracies inherent in presently used detection systems can be overcome by the use of ultrasonic vehicle detection means such as that disclosed by Kendall et al. in their pending application Ser. No. 808,736 filed April 24, 1959, now Patent No. 3,042,303; and, by combining this basic ultrasonic detection means with the interlocking system disclosed herein, it is possible to have a versatile counting system which can maintain an accurate count of the spaces available within a designated parking area without impeding the maximum flow of traffic into and out of the area. The present invention permits the use of wide, unrestricted multilane entrance and exit passageways, while maintaining a highly accurate running total of the parking spaces available within the area at any given time without requiring strict channeling of traffic to the defined lanes.

However, it should be noted at the outset that while the preferred form of the invention herein utilizes ultrasonic detectors, it would be equally feasible to use any form of detection system providing a signal corresponding to the presence of vehicles within each of a given series of detection zones.

In general, the invention herein utilizes an ultrasonic detection system having a series of transducers mounted over and across the passageway being monitored, the transducers being arranged in a line perpendicular to the general direction followed by traffic using the passageway. Each transducer is spaced so that its detection zone (that is, the area covered by its transmitted beam of ultrasonic pulses) is less than one car-width from the detection zones of its adjacent transducers. This assures that any vehicle going through the passageway will pass through at least one of the detection zones.

During the time when a vehicle is within a given detection zone, a signal is produced which maintains an occupancy device, corresponding to that particular detection zone, in its picked up position. As the vehicle leaves a detection zone, the occupancy relay drops away and causes a counting pulse to be produced. Interlocking circuits are used to provide that only one counting pulse is produced even by a vehicle travelling at an angle to the general direction of the passageway and thereby leaving adjacent detection zones at different times.

Also, interlocking circuits assure the production of separate and distinct pulses whenever two non-adjacent detection zones are passed through simultaneously. This provides for the detection of more than one vehicle at the same time.

Counting pulses, produced in response to the detection of vehicles leaving the designated area, represent new available spaces within the area and are designated "add" pulses, while the detection of entering vehicles results in the production of "subtract" pulses. These counting pulses are fed to a bank of memory devices where they are stored until corresponding pulses have been sequentially fed to a totalizer which increases its registration by one unit in response to each "add" pulse it receives, and decreases its registration one unit in response to each "subtract" pulse. The bank of memory devices provides the means necessary to the accurate counting of a plurality of vehicles entering and leaving simultaneously.

It is an object of this invention to provide a system for counting a plurality of objects simultaneously passing a fixed point.

It is a further object of this invention to provide a system for monitoring vehicles entering and leaving a designated area by means of passageways wide enough to permit more than one vehicle to enter or leave at the same time, wherein a running count is maintained of the spaces available within the area at any given time.

It is a further object of this invention to provide a system for detecting a vehicle traveling through a multilane passageway in a line not parallel to the general direction of the said passageway, wherein such a vehicle will be only counted once even though it passes out of adjacent detection zones at different times.

It is another object of this invention to provide a system for maintaining a single accurate total of "add" and "subtract" counting pulses even though the pulses may be produced simultaneously.

Other objects, purposes and characteristic features of the present invention will be in part obvious from the accompanying drawings, and in part pointed out as the description of the invention progresses.

For the purpose of simplifying the illustration and facilitating the explanation, the various parts and circuits constituting the embodiment of the invention have been shown diagrammatically and certain elements have been left in block form, the drawings have been made more with the purpose of making it easy to understand the principle and mode of operation, than with the idea of illustrating the specific construction and arrangement of parts that would be employed in practice. The symbols (+) and (−) are employed to indicate the positive and negative terminals respectively of suitable batteries, or other sources of direct current. The circuits with which these symbols are used always have current flowing in the same direction.

In describing the invention in detail, reference will be made to the accompanying drawings, in which like reference characters designate corresponding parts throughout the several views, and in which:

FIG. 4 shows in schematic form the Add Count Pulse Generation circuit referred to in FIG. 1;

FIG. 7 illustrates in schematic form the Counting Sequence Control circuit referred to in FIG. 1;

FIG. 8 is a relay operation chart showing the sequence of relay operation for the Counting Sequence Control circuit illustrated in FIG. 7 as based upon certain assumed facts;

FIG. 10 is a schematic diagram of the Counting Sequence Control circuit used in the modified form illustrated in FIG. 9.

Figure 1:
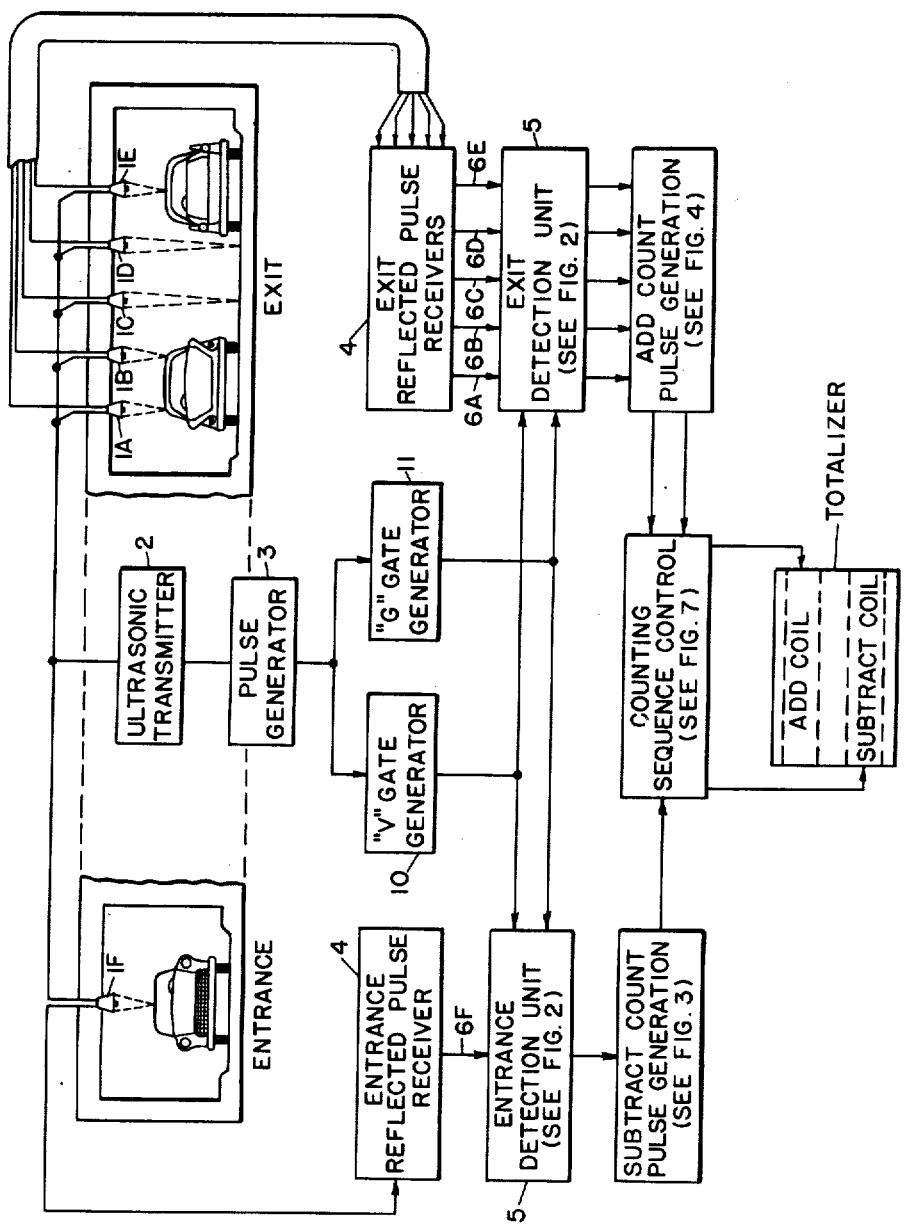
FIG. 1 is a block diagram of the entire circuit of one embodiment of the invention herein.

In the embodiment illustrated in FIG. 1, it is assumed that the invention herein is being utilized to monitor a parking area having a single lane entrance and a multi-lane exit. The following detailed description of the circuits which make up the various components of this illustrated embodiment shall be divided into three distinct parts, namely, Detection, Count Pulse Generation, and Counting Sequence Control. While each of these parts is integral to the invention herein, each can be understood without extensive reference to the other parts, and for this reason it is felt that this method will facilitate disclosing the invention.

Attention is again called, however, to the fact that while the preferred combination shows the utilization of an ultrasonic detection system, any vehicle detection system will suffice as well so long as it can provide a selective signal corresponding directly to the time a passing vehicle remains within each of the particular detection zones.

Detection

The type of ultrasonic detection system suggested by FIG. 1 utilizes transducers 1 sublettered A through F, the subletters corresponding to a series of detection zones, the areas of which are determined by the width of the beam of ultrasonic energy transmitted by each transducer. Detection zones A through E are determined by transducers 1A through 1E, which are mounted overhead adjacent to each other in a line perpendicular to the general direction of the exit lane. The distance between each detection zone must be less than the width of the narrowest vehicle which is to be detected by the system. This assures that any vehicle passing through the exit passageway must pass through at least one of the detection zones.

Single transducer 1F is sufficient to monitor the single entrance lane.

A single Ultrasonic Transmitter 2 drives each transducer 1, causing each transducer 1 to transmit a series of intermittent, short pulses of ultrasonic energy. The pulse repetition rate of this transmitted signal is controlled by Pulse Generator 3 and is selected so that the time between each transmitted pulse is sufficient to allow for the receipt of pulses reflected from the floor of the passageway back to transducers 1.

Each transducer is connected to its own particular receiving circuit 4 which amplifies, filters and rectifies the reflected pulses of ultrasonic energy received by each said transducer 1. The filtered and rectified reflected pulses are then fed to detection units 5, the system having one detection unit corresponding to each transducer-monitored detection zone.

Figure 2:
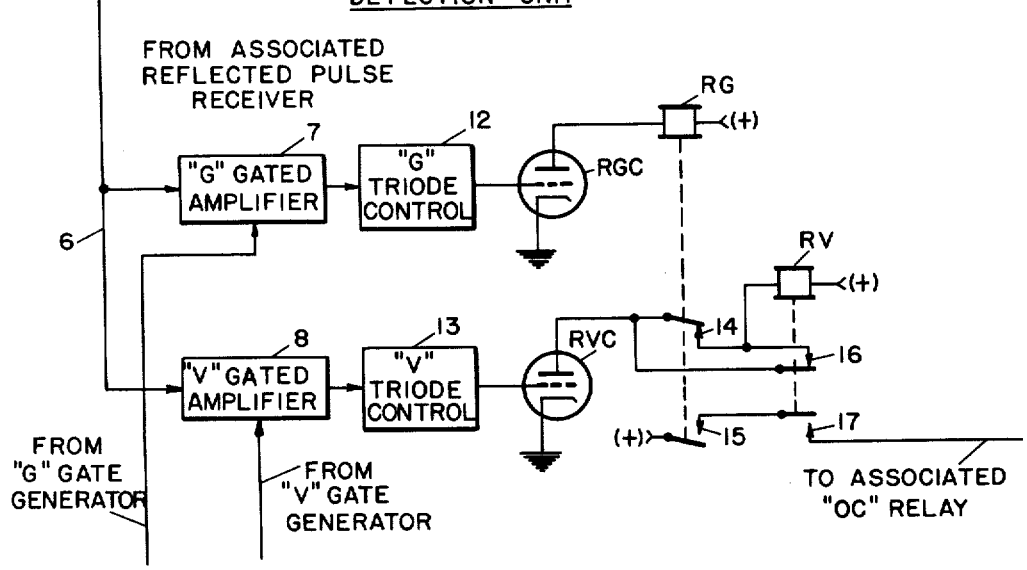
FIG. 2 illustrates in combination block and schematic diagram one single detection unit of the type employed in multiple form as referred to in FIG. 1.

Referring to FIG. 2, reflected pulses fed to each detection unit on line 6 are fed to gated amplifiers 7 and 8 which are gated, respectively, by a "V" gate and a "G" gate. Gate generators 10 and 11 (see FIG. 1) are triggered by pulse generator 3 which also triggers common transmitter 2, as stated above.

The gates are chosen so that only pulses reflected from the floor of the passageway will be passed through "G" Gated Amplifier 7, while any pulses reflected from the surface of vehicles passing through the respective detection zones will be gated through "V" Gated Amplifier 8.

R-C time constant circuits represented in block form as Triode Control 12 and 13 cause the build-up of cut-off bias on the grids of Relay Control Triodes RGC and RVC in accordance with the reception of reflected pulses passed by gated amplifiers 7 and 8. Thus, when a steady succession of pulses is passed by one of the gated amplifiers, its corresponding Relay Control Triode is cut-off. Since a steady train of pulses is normally reflected from the floor of the passageway when no vehicle is present within the detection zone, and since these pulses arrive during the "on" portion of the "G" gate, G-Relay Control Triode RGC is normally cut-off. At the same time, when vehicles are not present within a particular detection zone, no pulses are being received during the "on" portion of the "V" gate, and V-Relay Control Triode RVC is normally conducting.

Conversely, the presence of a vehicle within the detection zone cuts off the normally present stream of pulses reflected from the floor of the passageway, and, instead, pulses are reflected from the surface of the passing vehicle and are received during the "on" portion of the "V" gate. As the result of this, G-Relay Control Triode RGC begins to conduct, while V-Relay Control Triode RVC becomes cut-off.

When G-Relay Control Triode RGC is conducting, a circuit is closed from (+), through the winding of G-Relay RG and triode RGC to ground, causing relay RG to pick up. However, since reflections are normally being received from the floor of the passageway, G-Relay Control Triode RGC is normally cut-off, opening the circuit to the winding of G-Relay RG and Relay RG is normally dropped away as shown, closing back contact 14 and opening front contact 15.

It should also be obvious that as long as triode RVC is normally conducting and triode RGC is cut-off, a circuit is closed from (+), through the windings of V-Relay RV and back contact 14, through triode RVC to ground, causing relay RV to remain picked up. The stick circuit for relay RV provided by means of front contact 16 assures that relay RV will remain picked up as long as no signal is received during the "V" gate. Thus, even though a person or animal walking through the detection zone may cut off the chain of pulses normally reflected from the floor of the passageway, causing relay RG to pick up temporarily, no reflections are received during the "V" gate (the transmitted pulses of ultrasonic energy being absorbed by the person or animal and not reflected), and the stick circuit maintains relay RV in its picked up position. In this way, the presence of a person or animal within the detection zone may cause the closing of front contact 15, but the Detection Zone Occupancy Circuit including front contact 15 and back contact 17 remains open at back contact 17.

Figure 3:
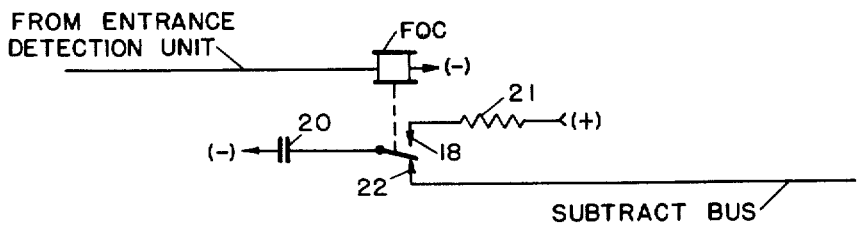
FIG. 3 illustrates in schematic form the Subtract Count Pulse Generation circuit referred to in FIG. 1.

On the other hand, whenever a vehicle appears within the detection zone associated with a particular detection unit, relay RG picks up and relay RV drops away closing both front contact 15 and back contact 17. This completes the Detection Zone Occupancy Circuit and causes the picking up of an Occupancy ("OC") relay associated with that particular detection zone. (Occupancy relays are shown in FIGS. 3 and 4 and will be discused in connection with Count Pulse Generation.)

It should be noted that if the vehicle passing through a particular detection zone is a convertible, the fabric top of which will absorb rather than reflect the beamed pulses of ultrasonic energy, the temporary loss of reflections from the surface of the passing convertible will not cause "V" relay control triode RVC to conduct as might be expected, because the plate circuit of triode RVC remains open at front contact 14 as long as no pulses are being reflected from the floor of the passageway due to the presence of the vehicle. Obviously, front contact 16 is open at such a time, relay RV having been dropped away due to the cutting off of triode RVC in response to the reception of pulses reflected from the hood of the convertible during the "on" portion of the "V" gate.

As a vehicle completes its passage through its detection zone, pulses are once again received from the floor of the passageway, arriving during the "on" portion of the "G" gate, while pulses are no longer received during the "V" gate, and relays RG and RV drop away and pick up once again, respectively, as explained above. This opens the Detection Zone Occupancy Circuit at front contact 15 and back contact 17, and allows the associated Occupancy Relay to drop away once more.

Thus, it can be seen that the detection units corresponding to each detection zone cause an associated Occupancy Relay to pick up and stay up during the time a vehicle is present in that particular detection zone.

From this point on, the chain of events which has just been described will not be referred to again. Instead, during the remainder of this specification it shall be merely assumed that a particular Occupancy Relay is operated to its picked up position whenever a vehicle is present within the detection zone corresponding to that particular relay.

Count Pulse Generator

Each vehicle entering the parking area represents one less available parking space within the area, while each vehicle leaving the area represents one additional available parking space. With a totalizer originally set to indicate the total number of spaces available within the area, a running count of the number of spaces available at any given time can be maintained by subtracting one unit from the totalizer for each vehicle entering the area and adding one unit for each vehicle leaving the area.

FIG. 3 shows the simple circuit required for the generation of one "subtract" pulse corresponding to each vehicle entering the area. F-Occupancy Relay FOC is picked up and maintained picked up, as explained above, so long as a vehicle is present within the single detection zone monitoring the entrance way to the area.

When relay FOC is picked up in response to a vehicle entering its associated detection zone, front contact 18 is closed and capacitor 20 is charged through resistor 21. When the vehicle completes its passage through the detection zone, relay FOC drops away closing back contact 22 and capacitor 20 discharges through the Subtract Bus. The pulse created by the discharge of capacitor 20 is sufficient to pick up Subtract Count Memory Relay SM (FIG. 7) which will be referred to again below in connection with the description of the Counting Sequence Control circuits. For the present, it is sufficient to understand that the passage of each vehicle through the detection zone causes the generation of a single "subtract" count pulse as just explained.

The multilane exit, however, cannot be handled so simply, since a single vehicle may pass through either one or two detection zones as it leaves the area. Also, more than one vehicle can pass through the exit passageway at the same time. The circuits illustrated in FIG. 4 have been designed to provide a single counting pulse in response to the passage of a single vehicle, even though that vehicle may pass through more than one detection zone, and also to provide two separate counting pulses for two vehicles simultaneously leaving the area.

In general, the Add Count Pulse Generation circuits of FIG. 4 consist mainly of five Occupancy Relays corresponding to each of the five detection zones which span the exit, each Occupancy Relay being operated in response to the presence of a vehicle within its associated detection zone as explained in detail above. The dropping away of each Occupancy Relay results in a production of an "add" count pulse. Occupancy relays AOC and EOC, corresponding to the two outside detection zones, have stick circuits controlled by adjacent occupancy relays BOC and DOC, respectively. Center occupancy relay COC sticks, or is stuck by adjacent occupancy relays BOC and DOC, respectively, in accordance with the position of stick switch relays BS or DS, respectively. These stick circuits are provided in order to consolidate the counting pulses produced by adjacent occupancy relays in response to the passage of a single vehicle.

Relays AB and ABC are used to separate pulses produced by two vehicles passing through the exit passageway at the same time. Whenever two or more non-adjacent occupancy relays are energized at the same time, the "add" count pulses created by the dropping away of these relays are fed to separate Add Buses.

The interaction of the relays shown in FIG. 4 can best be understood from the standpoint of their operation. First, single car operation will be discussed assuming conditions set up by a vehicle traveling each of the possible pathways shown in FIGS. 5A, 5B, 5C and 5D. Following that, two car operation will be described assuming the two possible conditions illustrated in FIGS. 6A and 6B.

Figure 5A:
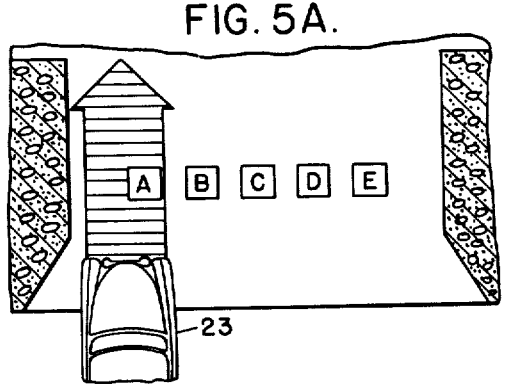
FIGS. 5A, 5B, 5C and 5D illustrate four of the many possible paths that may be taken through the detection zones by a single vehicle.

A single vehicle leaving through the exit passageway in a line parallel with the general direction of the passageway and passing through only a single detection zone as illustrated in FIG. 5A, produces a simple relay action similar to that already discussed in relation to Subtract Count Pulse Generation. Namely, as the vehicle enters and then leaves the particular detection zone, its associated occupancy relay picks up and then drops away, producing the desired single count pulse.

In the particular case illustrated in FIG. 5A, A-Occupancy Relay AOC picks up as car 23 enters Detection Zone "A" closing front contact 24 and causing a charge to be built up across capacitor 25 through resistor 26. Moments later, when car 23 passes out of Detection Zone "A," relay AOC drops away and capacitor 25 discharges through back contacts 29 and 27, placing an "add" count pulse on Add Bus "A." This causes Add Count Memory "A" relay AMA (FIG. 7) to pick up, but, as stated above, this portion of the circuit will be discussed further below.

It should be noted that the simple relay operation just described is equally applicable to all the occupancy relays when a vehicle passes through only a single detection zone.

Figure 5B:
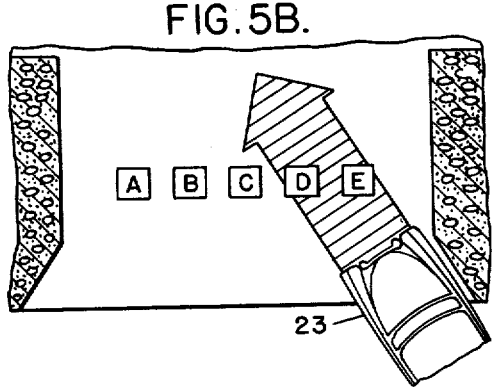

Turning now to the assumed path illustrated in FIG. 5B, it can be seen that car 23 enters Detection Zone "E" first, then, while still within Detection Zone "E," it also enters Detection Zone "D." Next, it passes out of Detection Zone "E" but is still in Detection Zone "D," and, finally, is passes out of Detection Zone "D."

Following the effect of this chain of events in the Add Count Pulse Generation circuits of FIG. 4, it can be seen that relay EOC picks up first, closing its front contacts and allowing capacitor 28 to charge through resistor 30 and front contact 31. Moments later, relay DOC picks up as car 23 enters Detection Zone "D" (relay EOC is still up since car 23 is still within Detection Zone "E"). This closes front contact 32 and charges capacitor 33, and, at the same time, closes front contact 34, completing a stick circuit for relay EOC from (+) through front contacts 34 and 35, and through the windings of relay EOC to (−). When car 23 passes out of Detection Zone "E," relay EOC cannot drop away and no counting pulse is produced until car 23 completely clears Detection Zone "D." At this time relay DOC drops away opening front contact 34, and relay EOC also drops away. Also, back contacts 36 and 37 of relays DOC and EOC, respectively, are closed allowing capacitors 33 and 28 to discharge their combined pulses into Add Bus "A."

It can be seen that it is necessary to stick adjacent occupancy relays in such a way that both relays drop away only after the vehicle has completely passed through both detection zones. A vehicle passing at an angle through center Detection Zones "B" and "C" (or "C" and "D") may leave either of the two zones first, according to its direction of travel. For this reason it is necessary to reverse the stick circuits tying together corresponding occupancy relays BOC and COC (or COC and DOC) in accordance with the vehicle's direction of travel. This necessary reversal of stick circuits is accomplished by means of Stick Switch Relays BS and DS.

Figure 5C:
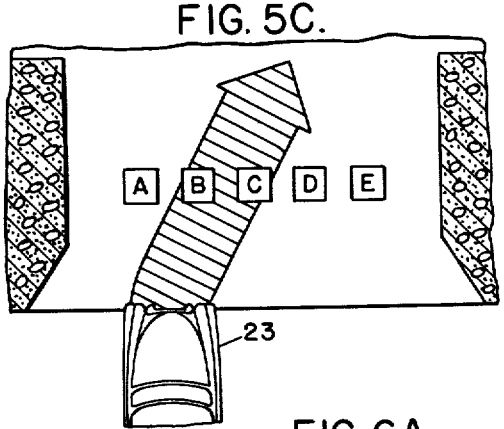

To illustrate the opeartion of Stick Switch Relay DS, it is now assumed that car 23 leaves the designated area in the manner illustrated in FIG. 5C, entering Detection Zone "B" and Detection Zone "C," and then leaving Detection Zone "B" and finally leaving Detection Zone "C."

When car 23 enters Detection Zone "B," relay BOC picks up closing front contact 38 and allowing a charge to be built up across capacitor 39. At the same time, front contact 41 is closed and this closes a pick-up circuit for stick switch relay BS from (+) through back contact 42 (of relay COC) front contact 41 and the windings of relay BS to (—), causing relay BS to pick up. Moments later, relay COC picks up closing its front contact 43 which allows capacitor 44 to charge. The picking up of relay COC also closes front contact 45 which completes the stick circuit for relay BOC from (+), through front contacts 45, 46 and 47 and the windings of relay BOC to (—). At the same time, front contact 48 is closed completing a stick circuit for stick switch relay BS from (+), through front contacts 48 and 49 and the winding of relay BS to (—).

When car 23 leaves Detection Zone "B," B-Occupancy relay BOC does not drop away because of the stick circuits just described. However, when car 23 finally leaves Detection Zone "C," relay COC drops away opening its front contacts 45 and 48 and thereby opening the stick circuits for relay BOC and BS which also drop away. With the dropping away of relays COC and BOC, their respective back contacts 51 and 52 are closed permitting capacitor 44 to discharge through back contact 51 and permitting capacitor 39 to discharge through back contacts 52 and 27. The discharge of these two capacitors places a single elongated "add" count pulse on Add Bus "A."

Figure 5D:
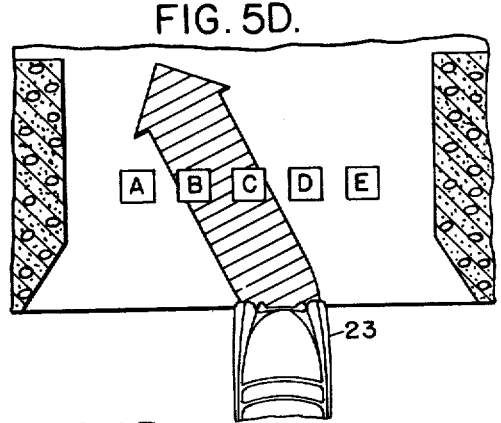

When car 23 reverses its general direction through the same two detection zones as illustrated in FIG. 5D, leaving Detection Zone "C" before it leaves Detection Zone "B," a reversal of the stick circuit arrangement just described above becomes necessary. Following through with this new assumed path, C-Occupancy relay COC will pick up first closing its front contact 43 and permitting capacitor 44 to charge, and, at the same time, opening back contact 42 so that when relay BOC picks up moments later the pick up circuit for stick switch relay BS is open, relay BS remaining dropped away. However, when relay BOC picks up with relay BS dropped away a stick circuit for relay COC is closed from (+) through front contact 53 (of relay BOC), back contact 54 and front contact 55 through the windings of relay COC, to (—).

Thus, when car 23 leaves Detection Zone "C," relay COC cannot drop away, but moments later when car 23 leaves Detection Zone "B," relay BOC drops away opening its front contact 53 and allowing relay COC to drop away also. At this time the nearly concurrent dropping away of relays BOC and COC closes their respective back contacts 52 and 51 allowing capacitors 39 and 44 to discharge, placing a single elongated "add" count pulse on Add Bus "A."

Without describing it in detail, it can be seen that stick switch relay DS operates in a similar fashion reversing the stick circuits tying relays COC and DOC in accordance with the direction of travel of a vehicle passing through the respective detection zones.

In relation to the stick circuits just described, particular attention is called to the possibility of two count pulses being produced in the event that a car should radically change its direction of travel while within the detection zones. That is, if car 23, as illustrated in FIG. 5C, enters Detection Zone "B" first and then radically reverses its general direction of travel so that it leaves the detection zones by the pathway illustrated in FIG. 5D, the stick circuit set up by its initial direction of travel when entering the detection zones would stick occupancy relay BOC on occupancy relay COC as explained above. However, with the reversal of direction, car 23 would pass out of Detection Zone "C" first, and occupancy relay COC would drop away immediately, with occupancy relay BOC dropping away after car 23 had cleared Detection Zone "B." While the probability of such a reversal is fairly small, provision is made for this eventuality and will be described below.

Figure 6A:
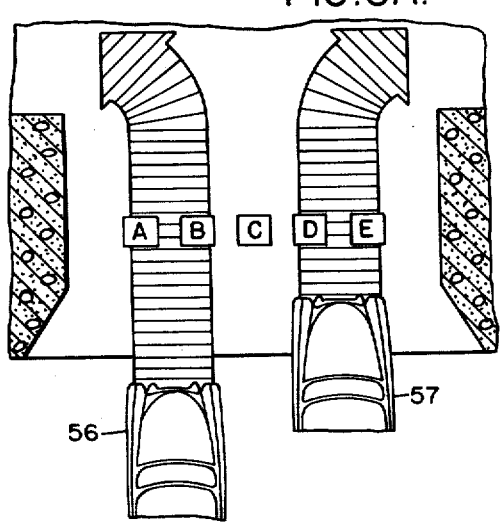
FIGS. 6A and 6B illustrate two possible paths that may be followed by each of two vehicles passing simultaneously through the detection zones.

Turning now to the handling of two cars, it is assumed that cars 56 and 57 are leaving the area at the same time as illustrated in FIG. 6A, car 56 passing through Detection Zones "A" and "B" and car 57 passing through Detection Zones "D" and "E." In response to cars 56 and 57 entering these detection zones, relays AOC, BOC, DOC, and EOC pick up, closing their front contacts 24, 38, 32 and 31, respectively, and allowing charges to be built up across capacitors 25, 39, 33 and 28, as explained above. At the same time, a circuit is closed from (+) through front contact 60 (of relay AOC) and from (+) through front contact 61 (of relay BOC), through back contact 62 of relay COC, front contact 63 of relay DOC and back contact 64 of relay ABC through the windings of Second Car relay AB to (—), and through resistor 65, charging capacitor 66 and causing relay AB to pick up, closing front contact 67. (It should be obvious that this same circuit would have been closed and car 56 passed only through Detection Zone "A," or only through Detection Zone "B," or had car 57 passed only through Detection Zone "D.")

When cars 56 and 57 leave their respective detection zones, the dropping away of occupancy relays EOC and DOC permits capacitors 33 and 28 to discharge as usual through back contacts 36 and 37, respectively, placing a single "add" count pulse on Add Bus "A." The dropping away of relay DOC opens the pick up circuit for relay AB at front contact 63, and the dropping away of relays AOC and BOC likewise open this same circuit at front contacts 60 and 61. However, capacitor 66 now discharges through resistor 65 and the windings of relay AB to (—), appreciably delaying the drop-away of relay AB. Thus, relays AOC and BOC drop away while relay AB is still in its picked up position, and capacitors 25 and 39 discharge through back contacts 29 and 52, respectively, and through front contact 67, placing a single counting pulse on Add Bus "B." In this way two separate "add" count pulses are produced in response to the passage of the two cars through the detection zones, one pulse being applied to Add Bus "A" and the second to Add Bus "B."

Figure 6B:
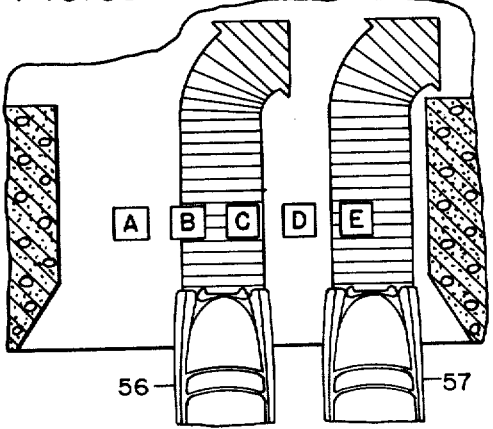

Assuming now that cars 56 and 57 are leaving the area by the pathways illustrated in FIG. 6B, namely, car 56 passing through Detection Zones "B" and "C" and car 57 passing through Detection Zone "E" only. Occupancy relays BOC, COC and EOC will pick up, closing their front contacts 38, 43 and 31, respectively, and allowing charges to build up across capacitors 39, 44 and 28. At the same time a circuit is closed from (+) through front contact 61 (of relay BOC) and from (+) through front contact 68 (of relay COC) and through back contact 69, front contact 70 and back contact 71 through the windings of Second Car relay ABC to (—) and through resistor 72, charging up capacitor 73, causing relay ABC to pick up, and closing front contact 75.

When cars 56 and 57 pass out of their respective detection zones, allowing relays BOC, COC and EOC to drop away, the just mentioned pick up circuit for relay ABC is open, but the discharge of capacitor 73 through resistor 72 and the windings of relay ABC to (—) appreciably delays the dropping away of relay ABC. The dropping away of relay EOC closes back contact 37 and allows capacitor 28 to discharge through back contact 37 and place an "add" count pulse on Add Bus "A." Upon the closing of back contacts 52 and 51 of relays BOC and COC, respectively, capacitors 39 and 44 discharge through back contacts 52 and 27 and through back contact 51, respectively, and then through front contact 75 of relay ABC, placing an "add" count pulse on Add Bus "B."

Without going into each possible combination in detail, careful analysis will show that the simultaneous pick up of any two or more non-adjacent occupancy relays will cause the pick up of either relay AB or relay ABC and result in two separate count pulses, one on Add Bus "A" and the other on Add Bus "B."

While the distance between the detection zones of the multilane exit limits the probability of two cars occupying adjacent detection zones at the same time, it should be noted that this is still a possibility, and in such a case neither Second Car relay AB or Second Car relay ABC will be picked up, and the cars would only be differentiated if they left the detection zones at different times. In the event that two cars passed through and out of adjacent zones at exactly the same time, they will be counted as one car, and, while the probability of this is fairly limited, provision is made for this eventuality as will be described below.

*Counting Sequence Control*

In general, the Counting Sequence Control circuits diagrammed in FIG. 7 are designed to receive "add" and "subtract" count pulses produced by the Count Pulse Generation circuits explained above, to store these pulses temporarily, and to fed them sequentially to the totalizer in order to maintain a running count of the spaces available within the designated area monitored by this invention.

Memory relays AMA, AMB and SM are used to store the pulses which appear on Add Bus "A," Add Bus "B," and the Subtract Bus, respectively. Add Count Relay AC and Subtract Count relay SC, in conjunction with Count Repeater relay CP send impulses, respectively, to the "add" and "subtract" coils of the totalizer in accordance with the information stored on the memory relays. Restoration relays ABR and SMR are used to clear the Memory relays after the information stored on them has been transposed to the totalizer.

The circuits of FIG. 7 can best be understood from the standpoint of their operation. The following description will be based upon the assumed facts that two cars are leaving the designated area at the same time, that a third car is entering the area, and that a fourth car leaves immediately behind the first two. As the sequence of relay operation is described, reference can be made to FIG. 8 which is a chart showing relay operation against time based upon these assumed facts.

As the two leaving cars pass out of the detection zones, an "add" count pulse appears on Add Bus "A," and a second "add" count pulse appears on Add Bus "B," as explained above.

At the same time, the entering car clears Detection Zone "F" and this results in the appearance of a "subtract" count pulse on the Subtract Bus. These three pulses are sufficient to cause Memory relays AMA, AMB and SM to pick up, and these memory relays are immediately stuck up. Relay AMA is stuck through front contact 76 and back contact 78 of count repeater relay CP, while relay AMB is stuck up through its front contact 77 and through both back contacts 78 and 79, and relay SM is stuck through its front contact 80 and through both back contact 81 of relay CP and through back contact 82 of Subtract Count Memory Restoration relay SMR.

It should be noted that upon the picking up of the memory relays, leakage paths are provided through resistor 83 and front contact 84 of relay AMA, through resistor 85 and front contact 86 of relay AMB, and through resistor 87 and front contact 88 of relay SM. These leakage paths are provided to dissipate any pulse-forming charges remaining on the capacitors associated with the occupancy relays (FIG. 4) after each memory relay has picked up. Thus, whenever a vehicle passes through two adjacent detection zones resulting in the discharge of the two associated capacitors into a single Add Bus (as explained above), these leakage paths assure that their associated memory relay will not be picked up again by the same initiating pulse following a counting cycle.

The picking up of relay AMA initiates the first counting cycle by closing the circuit from (+) through front contact 90 of relay AMA and back contact 91 of Count Repeater relay CP, and through the windings of Add Count relay AC to (—), picking up relay AC and also charging capacitor 92 through resistor 93. When relay AC picks up, it closes front contact 94, causing Count Repeater relay CP to pick up and charging capacitor 95 through Statistical Adjustment Potentiometer 96. (Further reference is made below to Statistical Adjustment Potentiometer 96.)

When Count Repeater relay CP picks up, it opens back contact 91, thereby opening the circuit maintaining Add Count relay AC. However, relay AC does not drop away immediately, since its drop away is appreciably delayed by the discharge of capacitor 92 through resistor 93 and the windings of relay AC. At this time, with relay CP picked up and relay AC still in its picked up position, an impulse is delivered to the Add Coil of the totalizer by the closing of the circuit from (+), through front contact 97 of relay CP and front contact 98 of relay AC, through the Add Coil, to (—). This impulse results in the increase of one unit to the total count then appearing on the totalizer.

When relay AC picked up, during the relay sequence just described, it closed an additional stick circuit for memory relay AMA from (+), through front contact 99 of relay AC and front contact 76 of relay AMA, through the windings of relay AMA, to (—), so that when relay CP picked up, opening its back contact 78, relay AMA remained stuck up.

Following the discharge of capacitor 92, relay AC drops away and opens the stick circuit maintaining relay AMA at front contact 99, and at the same time, it opens the circuit maintaining relay CP at front contact 94. The dropping away of relay CP is appreciably delayed, however, by the discharge of capacitor 95 through potentiometer 96 and the windings of relay CP. This delay assures that the memory relays, and in this particular instance, relay AMA, will completely drop away before back contact 78 of relay CP is closed once again.

During this just described counting cycle, Memory relay AMB has remained stuck up through back contact 79 of Add Count Memory B Restoration relay ABR, and as soon as relay CP drops away once again, closing its back contact 91, the next counting cycle is initiated. Relay AC is now picked up again by the closing of a circuit from (+) through front contact 101 of relay AMB and back contact 91 of relay CP through the windings of relay AC to (—), and capacitor 92 is charged once again. The picking-up of relay AC closes front contact 94 and picks up relay CP, also charging capacitor 95. When relay CP picks up, it opens its front contact 91, opening the circuit maintaining relay AC. However, as explained above, the dropping away of relay AC is delayed by the discharge of capacitor 92, and the impulse circuit to the Add Coil of the totalizer, including front contact 97 of relay CP and front contact 98 of relay AC, is closed once again, adding another unit to the count appearing on the totalizer.

During this second counting cycle when relay CP is picked up and relay AC is being retained in its picked up position by the discharge of capacitor 92, the pick-up circuit for Add Count Memory B Restoration relay ABR is closed from (+) through front contact 103 of relay AMB, back contact 104 of relay AMA, front contact 105 of relay AC, and through the windings of relay ABR to (−) resulting in the pick-up of relay ABR. This opens front contact 79, and when relay AC finally drops away, opening its front contact 102, Add Count Memory B relay AMB is permitted to drop away. It should be noted that relay ABR is stuck by relay CP through front contacts 106 and 107. This assures that Memory relay AMB will completely drop away before Restoration relay ABR drops away and closes its back contact 79 once again.

Now, with relays AMA and AMB dropped away and relay SM still up by virtue of the stick circuit maintained through back contact 82 of Subtract Count Memory Restoration relay SMR, the circuit is ready to initiate the counting cycle once more. Thus, after relay AC drops away, opening front contact 94, and relay CP drops away following the discharge of capacitor 95, Subtract Count relay SC is then picked up by the closing of the circuit from (+), back contact 110 of relay AMA, back contact 111 of relay AMB, front contact 112 and back contact 113 through the windings of relay SC to (−). At the same time, capacitor 114 is charged through resistor 115. The picking up of relay SC closes front contact 116, once again picking up relay CP and charging capacitor 95. As CP picks up, it opens back contact 113, opening the circuit maintaining Subtract Count relay SC. Relay SC does not drop away immediately, however, due to the discharge of capacitor 114 through resistor 115 and the windings of relay SC to (−). With relay CP picked up and relay SC still in its picked up position, a circuit is closed to the Subtract Coil of the totalizer through front contacts 97 and 117 resulting in the decrease by one unit of the total count present on the totalizer.

During this same counting cycle in which relay SC picked up, a circuit is closed from (+) through front contact 120 of relay SM, back contacts 121 and 122, front contact 123 and back contact 124 through the windings of Subtract Count Memory Restoration relay SMR, to (−). This causes relay SMR to pick up, opening its back contact 82. Thus, when Subtract Count relay SC drops away following the discharge of capacitor 114, it opens its front contact 125, opening the stick circuit maintaining Memory relay SM and that relay drops away. In order to assure that relay SM may completely drop away, Restoration relay SMR is maintained stuck up through a circuit including front contact 126 of relay CP and its own front contact 127.

While this last counting cycle was in process, it was assumed that another car passed through the detection zones of the exit passageway and that Memory relay AMA was picked up by the resulting "add" pulse appearing on Add Bus "A." Relay AMA remained stuck up during this last described counting cycle by virtue of the stick circuits including front contact 128 of relay SC and front contact 129 of relay SMR. Since relay SMR was stuck on relay CP, back contact 78 of relay CP was closed prior to the opening of front contact 129 of relay SMR, thus maintaining the stick circuit for relay AMA.

When Count Repeater relay CP finally drops away following the discharge of capacitor 95, back contact 91 of relay CP is closed once again, and since front contact 90 of relay AMA has been picked up once again, the pick-up circuit for Add Count relay AC is closed and the original counting cycle explained in detail above is once again initiated. This results in another unit being added to the total count, and, finally with memory relays AMA, AMB and SM all being dropped away, the Counting Sequence Control circuit finally comes to a rest.

As the result of the relay operation just described, four nearly simultaneous counting pulses were stored and sequentially transposed to the totalizer with the final result increasing the total count by two units, indicating that two more spaces are available in the area following the passage of the four vehicles in accordance with the facts assumed.

*Statistical Potentiometer*

During the discussion of the Count Pulse Generation circuits illustrated in FIG. 4, attention was called to the fact that under certain conditions a single vehicle might be counted twice, and that two vehicles leaving together might be counted as only one vehicle.

In this connection it should be realized that there would be less probalility of one car being counted as two cars if the time between the generation of a counting pulse and its ultimate registration on the totalizer is made fairly long. That is, if the second of the two pulses produced by a single car is generated on the same bus that received the initial pulse at a time when the first pulse is still being processed, only one counting cycle will be initiated.

Contrarily, the probability of two cars being counted as only one becomes increasingly smaller as the speed of the processing of each count pulse increases. That is, if each counting pulse can be transposed to the totalizer before the next counting pulse appears upon the same bus, both of these counts would be registered, and cars leaving adjacent detection zones would be separately detected as long as they would not leave at the same exact moment.

It can be seen that these two probabilities of error are exactly opposed to each other. The faster the processing of each count pulse, the less likely will be the error of counting two cars as one, but more likely the error of counting one car as two. And contrarily, the opposite is true as the time for processing each pulse is increased.

In order to adjust for the statistical occurrences resulting in these errors, Statistical Adjustment Potentiometer 96 has been provided. By varying the resistance of this potentiometer, the discharge time of capacitor 95 can be controlled, in turn controlling the delay in the drop-away of Count Repeater relay CP. In this way, the total time required for the processing of each count pulse can be adjusted.

In practice, it has been found that the probabilities of error can be empirically limited by adjusting potentiometer 96. When the invention is first installed, a daily check is made to determine the error in the total count. If the error is on the high side, that is the totalizer finishes a day registering more spaces available than are in actuality available, the potentiometer is adjusted to increase the delay in the dropping away of relay CP. This lessens the probability that single cars will be counted twice.

On the other hand, if error in the totalizer is on the low side, potentiometer 96 is adjusted to speed up the counting cycle by shortening the delay in the drop away of relay CP.

It has been found in actual practice that by making the above mentioned statistical adjustment, the overall accuracy of the system herein is such that error is limited to less than one unit per thousand vehicles counted.

*Modified Form*

Figure 9:
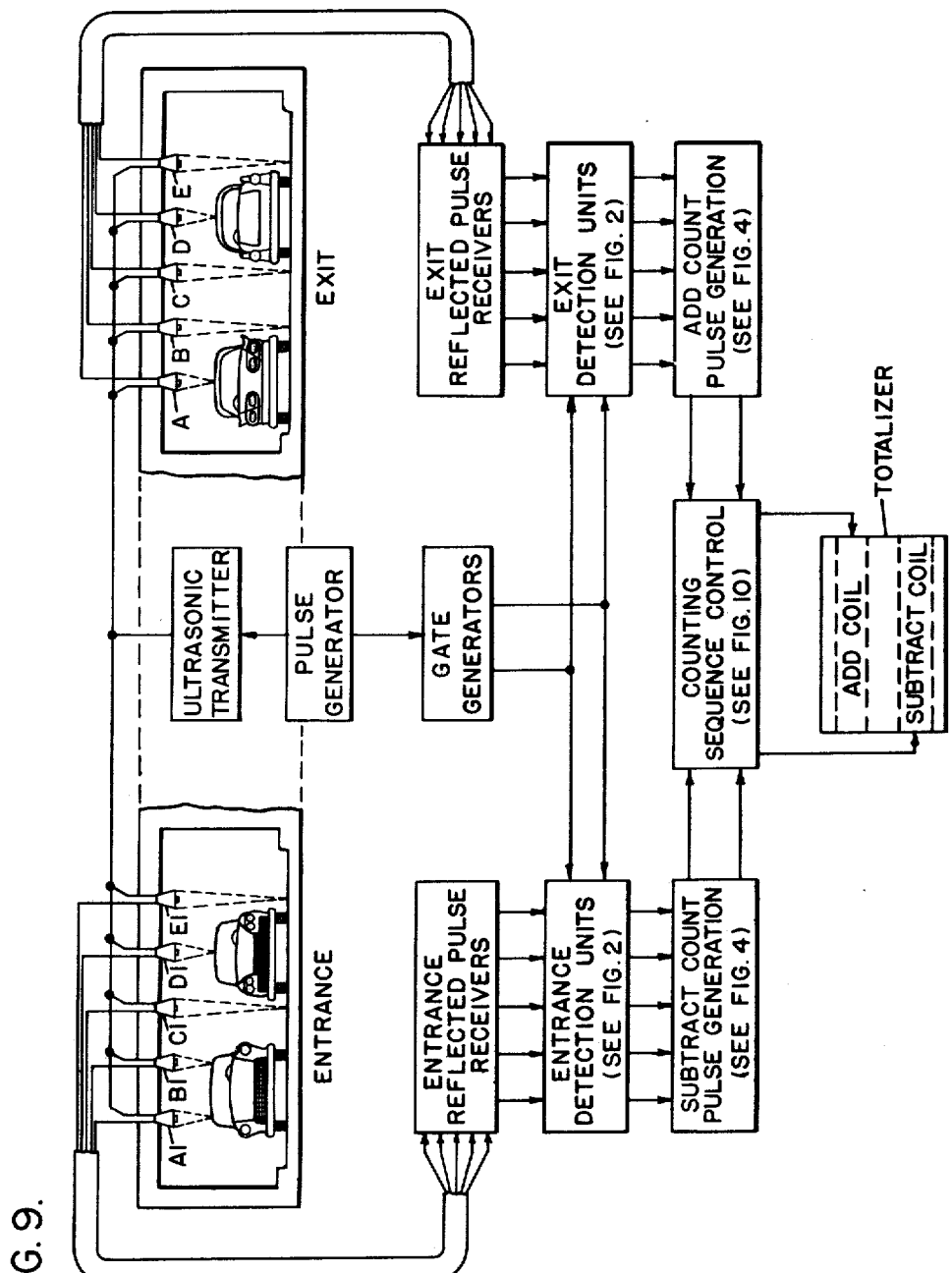
FIG. 9 is a block diagram of a modified form of the invention herein, utilizing multilane passageways for both the entrance and exit.

FIG. 9 is a block diagram of a modified form of the invention herein in which both the entrance and exit passageways provide for multilane traffic. The layout of the detection lanes, and the circuits for Pulse Reception, Detection Zone Occupancy, and Count Pulse Generation, are identical for both passageways.

The various circuits just mentioned are shown in FIGS. 2 and 4 and have already been explained in detail above. It should be obvious that the Add Count Pulse Generation circuit shown in FIG. 4 can be used in conjunction with the multilane entrance of this modified form. No changes are required in the circuit. All that is necessary is that the output buses be tied to Subtract Count Memory relays instead of Add Count Memory relays, the output buses of FIG. 4 becoming: Subtract bus "A" and Subtract Bus "B."

Thus, this modified form has two separate Subtract

Buses as well as two separate Add Buses. Since, as explained in detail above, separate count pulses can appear simultaneously on both output buses of the Count Pulse Generation circuit, the addition of a multilane entrance as well as a multilane exit creates the possibility of an additional simultaneously produced "subtract" count pulse. In order to provide for the storage and transposition of this additional count pulse, two relays are added to the basic circuit illustrated in FIG. 7 (explained in detail above).

FIG. 10 is a schematic diagram of the Modified Counting Sequence Control circuit which is used in conjunction with this multilane-enrance and -exit system. This modified circuit differs from the circuit illustrated in FIG. 7 and explained above only in the addition of a fourth Memory relay and a corresponding Restoration relay.

Referring to FIG. 10, Subtract Count Memory B relay SMB is picked up whenever a pulse is generated on Subtract Bus B, and relay SMB remains stuck up until back contact 131 of Subtract Count Memory B Restoration relay SBR is opened. The operation of relay SBR is similar to the operation of the other restoration relays which were discussed in detail above. Relay SBR is not picked up until all of the other memory relays have been released, and, once picked, it is stuck up through front contact 132 of relay CP. This assures that Memory relay SMB has time to drop away completely, following the opening of front contact 133 of relay SC, before back contacts 131 and 134 are returned to their normally closed position.

In general, the operation of the Modified Counting Sequence Control circuit of FIG. 10, including the initiation of each counting cycle, the production of impulses controlling the Add and Subtract coils of the totalizer, and the restoration of the Memory relays after each stored count has been transposed to the totalizer, is identical with the operation of the circuit illustrated in FIG. 7 and explained in detail above. While the two relays added in the modification of FIG. 10 increase the memory of the circuit for an additional subtract unit, they do not change the basic operation of the circuit which can be readily understood by referring to that part of the specification dealing with FIG. 7.

This modification of the invention herein provides a system for maintaining an accurate running account of the spaces available within a designated parking area, while permitting multilane traffic flow both into and out of the monitored area.

Having described two specific embodiments of the present invention, it should be understood that the forms selected have been chosen to facilitate in the disclosure of the invention rather than to limit the forms which the invention may assure. Therefore, it should be understood that various modifications, adaptations, and alterations may be applied to the specific forms shown to meet the requirements of practice without in any manner departing from the spirit or scope of the present invention.

What I claim is:

1. In a system for counting the number of vehicles passing through a defined passageway having a width permitting at least two vehicles to pass therethrough simultaneously, a plurality of vehicle detection means being located across said passageway and defining respective detection zones more closely spaced successively than the width of any vehicle and each being so constructed and arranged as to provide a momentary output signal upon the passage of a vehicle through the respective detection zone, counting means for counting discrete input signals successively applied to its input circuit, means for coupling each said vehicle detection means to said input circuit, said coupling means responding to substantially simultaneous output signals from vehicle detectors respectively defining adjacent detection zones by supplying a single input signal to said input circuit of said counting means but responding to substantially simultaneous output signals from vehicle detectors respectively defining non-adjacent detection zones by supplying time-spaced input signals to said input circuit, whereby a single vehicle passing simultaneously through adjacent detection zones is counted singly by said counting circuit means but a plurality of vehicles passing simultaneously through non-adjacent detection zones are separately counted by said counting circuit means.

2. A system for counting objects passing along an unrestricted passageway comprising, a plurality of detection means defining respective detection zones sufficiently closely spaced across said passageway to require each object passing through said passageway to pass through at least one detection zone, each said detection means being controlled by the passage of an object through the respective detection zone for producing a distinctive signal, counting pulse generation means controlled by said distinctive signals of said detection means for producing one counting pulse for each separately occurring distinctive signal produced by any one of said plurality of detection means and also for each adjacent pair of said detection means producing distinctive signals substantially simultaneously, said count pulse generation means including further means controlled by substantially simultaneously occurring distinctive signals from detection means for non-adjacent zones for producing a counting pulse for each such simultaneously occurring signal, counting pulse memory means for receiving and storing said counting pulses produced by said counting pulse generation means, totalizer means for registering and indicating a running total corresponding directly to the number of pulses received, counting sequence control means for sequentially feeding said counting pulses stored by said counting pulse memory means to said totalizer means, and restoration means controlled by said counting sequence control means for clearing said counting pulse memory means after said stored counting pulses have been fed to said totalizer by said counting sequence control means, whereby said totalizer maintains a running count of the objects passing through said passageway.

3. A system for monitoring vehicles passing through multiple lane passageways comprising, at least two vehicle detection means for each passageway, having their respective zones of influence sufficiently closely spaced across said passageway to require a vehicle to be detected by at least one of said detectors, each detection means producing a distinctive signal upon the passage of a vehicle, counting pulse generation means for producing count pulses in response to said distinctive signals, said counting pulse generation means responding to distinctive signals produced substantially simultaneously by adjacent detection means for generating a single count pulse but being controlled by distinctive signals produced substantially simultaneously by non-adjacent detection means for producing a separate count pulse for each simultaneously occurring distinctive signal, counting pulse memory means for temporarily storing said count pulses, counting means, and counting pulse sequence control means for sequentially feeding said stored electrical pulses to said counting means, whereby said counting means registers a single count for each vehicle passing through said multiple lane passageways.

4. The system according to claim 3 wherein said counting pulse generation means includes an occupancy relay for each vehicle detection means, means for operating each relay from its normal condition when the associated detector means is responsive to a vehicle but permitting the restoration of said relay only when neither said associated detector means nor a detector means for an adjacent zone is responsive to a vehicle, and means governed by the operation of each said relay from its said normal condition for producing a count pulse.

5. The system according to claim 3 wherein said counting pulses memory means comprises a plurality of memory relays one for each count to be stored, means controlled by each count pulse for operating one of said memory relays from a first condition to a second condition, means controlled by each memory relay operated to said second condition for applying a separate input pulse to said totalizer to change its count, and means governed by said change of count in said totalizer by said one memory relay for restoring it to its first condition.

6. The system according to claim 3 wherein, at least one of said passageways is an entrance way and at least one of said passageways is an exit way, and said counting means is a dual-coil impulse counter alternatively increasing and decreasing its registration by one count in response to impulses applied respectively to its two coils, said system further including means being controlled by said occupancy signals produced by said detection means for said entrance way for applying a count pulse to one coil of said counter and being controlled by said occupancy signals produced by said detection means for said exit way for applying a count pulse to the second coil of said counter.

7. Apparatus for vehicle counting comprising in combination, a plurality of vehicle detectors each defining a detection zone and each operating momentarily to a distinctive condition in response to the passage of a vehicle through the respective zone, electro-responsive counting means having an input circuit and advancing a single step in response to each application and removal of a pulse of electrical energy to said input circuit, coupling means for coupling said input circuit to each of said vehicle detectors, said coupling means applying an electrical energy pulse to said input circuit for each singly occurring detection of a vehicle by any of said plurality of said vehicle detectors but being governed by concurrent detections of plural vehicles by two or more of said vehicle detectors to apply a plurality of time-spaced electrical pulses to said input circuit, one for each of said vehicles which are concurrently detected.

8. The apparatus as defined in claim 7 in which said counting means has a predetermined operating time to advance one step in response to a pulse applied to said input circuit and said coupling means when responding to concurrent vehicle detections by said vehicle detectors applies said time-spaced pulses to said input circuit with a time spacing which at least equals said operating time of said counting means.

9. The apparatus as claimed in claim 7 in which said coupling means comprises a plurality of storage means at least equal in number to the maximum number of expected concurrent vehicle detections by said plurality of vehicle detectors, means for connecting any then responsive vehicle detector to one of said storage means and connecting concurrently responsive vehicle detectors to respectively different storage means, each said storage means when connected to a responsive detector being operated from its normal conditions to a distinctive condition, means for connecting each storage means when in its distinctive condition to said input circuit to thereby operate said counting means and connecting two or more of said storage means which are concurrently in said distinctive condition to said input circuit in time sequence, each said storage means being restored to its normal condition when it has been connected to said input circuit and produced operation of said counting means.

10. The apparatus of claim 7 wherein said plurality of detection zones defined respectively by said plurality of vehicle detectors are spaced across a vehicle passageway generally transverse to the direction of vehicle movement but with the spacing between successive detection zones being such that at least one but not more than two zones will be traversed by any one vehicle, said coupling means applying one electrical energy pulse to said input circuit when vehicle detectors respectively defining adjacent detection zones are concurrently responsive to a vehicle.

11. Apparatus for counting vehicles passing through a multi-lane passageway comprising in combination, vehicle detection means defining a plurality of detection zones spaced generally transverse to the direction of vehicle travel with a spacing causing each vehicle travelling through said passageway to traverse at least one but not more than two of said detection zones, said detection means being distinctively operated by each traversal of a detection zone by a vehicle, electro-responsive counting means having an input circuit and operating a single step in response to the application and removal of a control manifestation to said input circuit, means for coupling said counting means to said detection apparatus, said coupling means applying a single control manifestation to said input circuit from said detection means in response to the occupancy of a single of said detection zones and also in response to the substantially simultaneous occupancy of adjacent of said detection zones but applying time-spaced control manifestations to said input circuit in response to the substantially simultaneous occupancy of non-adjacent detection zones.

12. Apparatus for registering on a single counting means all the momentary control manifestations independently produced by at least two different sources which may at times produce said manifestations concurrently comprising in combination, a memory means for each said source being at each instant operatively connected to a respective source and being operable from a normal condition to a distinctive condition in response to a control manifestation from that respective source, means for holding each memory means in said distinctive condition when once operated thereto, electroresponsive counting means including an input circuit and operating to a different condition in response to each energization of said input circuit, means coupling each said memory means when in its distinctive condition to said input circuit, said coupling means governed by the concurrence of at least two of said memory means being respectively in their distinctive conditions to couple said two memory means in succession to said input circuit, each said memory means when in distinctive condition and coupled to said input circuit operating said counting means a single step, and means responsive to the operation of said counting means when any memory means is coupled thereto to restore said memory means to its normal condition.

13. A system for separately detecting vehicles passing through a passageway large enough to permit the passage of more than one vehicle at the same time comprising, a series of detection means defining respective detection zones sufficiently closely spaced across said passageway to require each vehicle passing through said passageway to pass through at least one detection zone, an occupancy relay operatively connected to each detection means and being operated from its normal condition in response to the traversal of the respective detection zone by a vehicle, control means for each occupancy relay permitting its restoration to the normal condition only if concurrently no vehicle is detected by the respective vehicle detector nor by the vehicle detectors for the immediately adjacent detection zones, and means governed by the restoration of any occupancy relay to its normal condition for registering the passage of a vehicle, whereby a vehicle proceeding through said passageway in directions other than perpendicular to said line of detection zones results in only a single vehicle registration, and the passage of a plurality of vehicles through non-adjacent zones simultaneously results in the registration of a plurality of vehicles.

(References on following page)

References Cited in the file of this patent

UNITED STATES PATENTS

| | | |
|---|---|---|
| 1,836,655 | Dunford | Dec. 15, 1931 |
| 1,982,341 | Hitchcock | Nov. 27, 1934 |
| 2,644,150 | Burn | June 30, 1953 |
| 2,672,393 | Cooper | Mar. 16, 1954 |
| 2,781,975 | Pudelko | Feb. 19, 1957 |
| 2,807,418 | Cunningham | Sept. 24, 1957 |
| 2,917,283 | Sumners | Dec. 15, 1959 |

FOREIGN PATENTS

| | | |
|---|---|---|
| 468,040 | Great Britain | June 28, 1937 |